No. 756,372. PATENTED APR. 5, 1904.
J. D. JOHNSON.
WINDMILL.
APPLICATION FILED SEPT. 29, 1903.
NO MODEL. 2 SHEETS—SHEET 2.

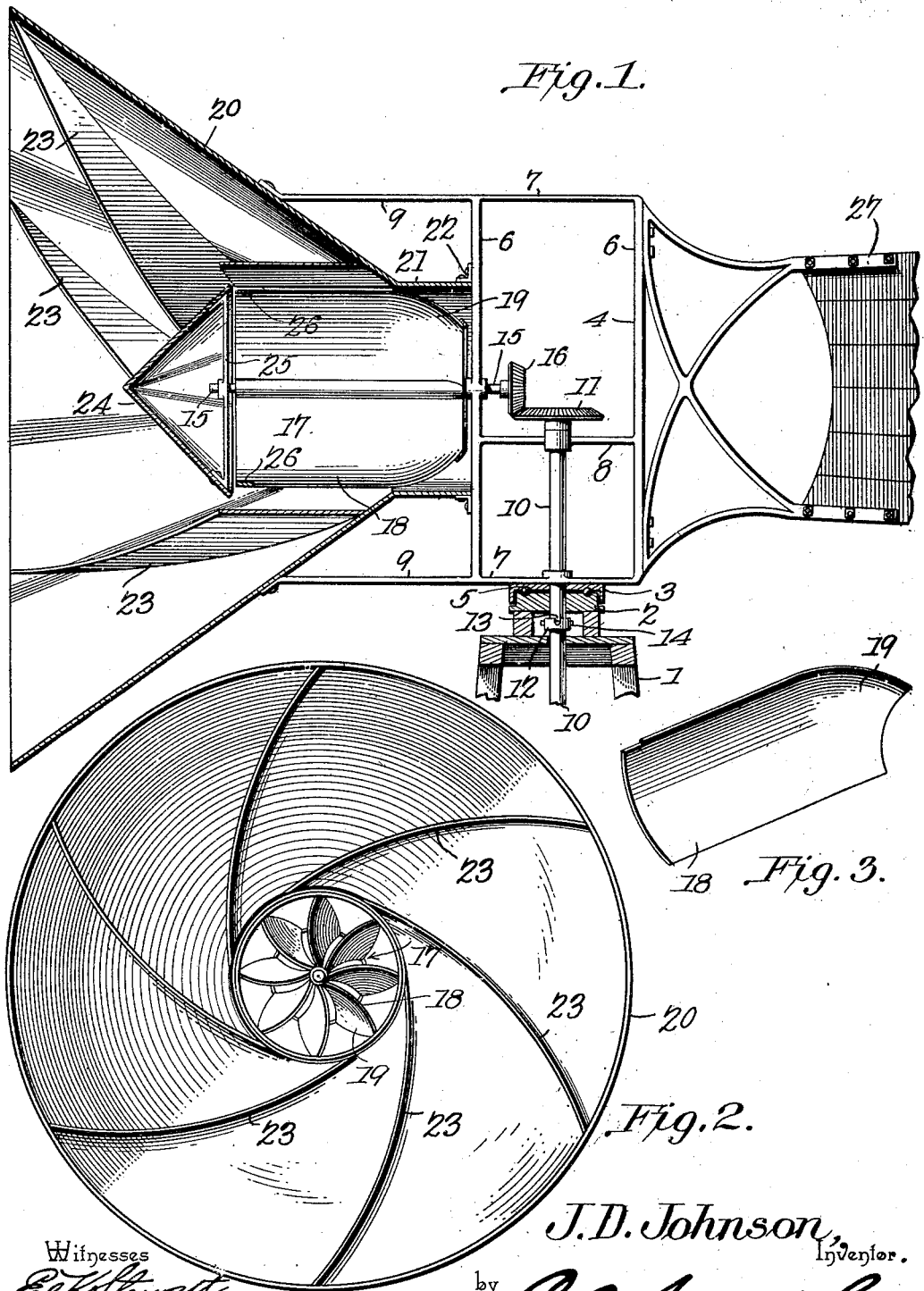

J. D. Johnson, Inventor.

Witnesses
by C. A. Snow & Co.
Attorneys

No. 756,372. Patented April 5, 1904.

UNITED STATES PATENT OFFICE.

JAMES DANIEL JOHNSON, OF CLOVERDALE, VIRGINIA.

WINDMILL.

SPECIFICATION forming part of Letters Patent No. 756,372, dated April 5, 1904.

Application filed September 29, 1903. Serial No. 175,069. (No model.)

*To all whom it may concern:*

Be it known that I, JAMES DANIEL JOHNSON, a citizen of the United States, residing at Cloverdale, in the county of Botetourt and State of Virginia, have invented a new and useful Windmill, of which the following is a specification.

My invention relates to windmills, and has for its object to produce a comparatively simple device of this character in which a wind-collecting bell or member will collect and direct or concentrate the wind upon the wind-wheel blades and impart to the wind an initial vortex or whirling motion prior to directing it upon said blades, one in which the wind will impart a final impetus to the blades during its exit from the wheel, and one in which the amount of wind admitted to the blades may be automatically regulated or controlled, thus automatically regulating the speed of the driven shaft.

To these ends the invention comprises the novel features of construction and combination of parts more fully hereinafter described.

Figure 4:
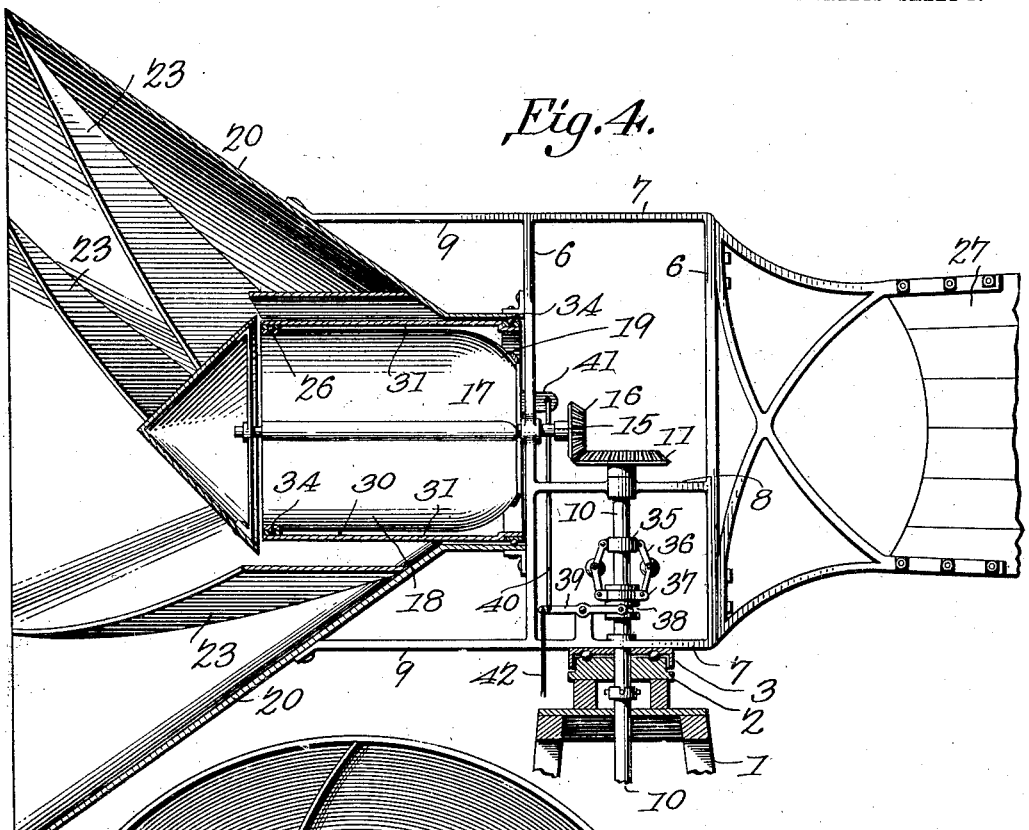
Figure 5:
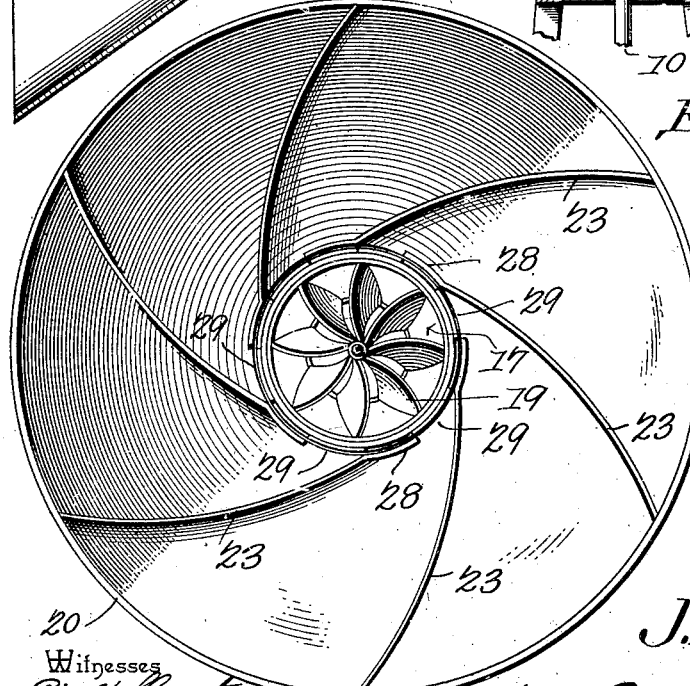
Figure 6:
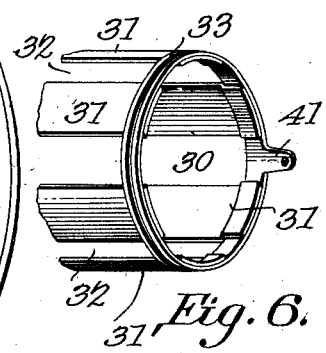

In the accompanying drawings, Figure 1 is a side sectional elevation of the upper portion of a windmill embodying my invention. Fig. 2 is a front elevation of the same. Fig. 3 is a detail perspective view of one of the blades. Fig. 4 is a view similar to Fig. 1 having my improved governing mechanism embodied. Fig. 5 is a front elevation of the same. Fig. 6 is a detail perspective view of the rotary wind-controlling or cut-off member.

Referring to the drawings, 1 indicates the windmill-tower of the usual or any preferred construction and carrying at its upper end a bearing member or head 2, reduced to receive a corresponding bearing member or cap 3, secured to a wind-wheel frame 4, there being disposed between the bearing members 2 and 3 a series of antifriction-balls 5.

The frame 4 comprises, preferably, a pair of vertically-disposed spaced side bars 6, connected at their upper and lower ends by horizontal end bars 7 and between their ends by an intermediate web or spider 8, the end bars being continued at one side of the frame to form a pair of horizontal arms 9, the purpose of which will presently appear.

10 designates a vertical shaft journaled for rotation in suitable bearings carried by the lower bar 7 and spider 8. This shaft, which carries at its upper end a horizontal bevel-gear 11, is composed of two sections, the lower of which carries at its upper end a cup-shaped step 12, provided with a series of upwardly-opening recesses 13, designed to receive horizontal pins or studs 14, provided at the lower end of the upper shaft-section, whereby the latter may yield slightly with respect to the lower section under the weight of the wind-wheel without in any wise impairing the proper operation of the parts.

15 designates a horizontal drive-shaft journaled for rotation in a suitable bearing carried by the front side bar 6. This shaft, which has fixed upon its inner end a vertical bevel-gear 16 in mesh with the gear 11, is extended a suitable distance forward of the frame for the reception of a wind-wheel 17, the hub of which is fixed to the shaft for driving the latter. The wind-wheel comprises a hub and a series of radiating horizontally-extending blades 18, which are slightly curved in cross-section, but are disposed in parallel relation with the hub except at their rear or exit ends, where they are given a partial twist or volution, as at 19, for the purpose which will hereinafter appear.

20 indicates an outwardly-opening conical or funnel-shaped wind-collecting bell or member terminating at its inner end in a tubular cylindrical extension 21, this bell being fixed to and sustained by the frame 4 by means of the arms 9, which are secured at their outer ends to the side of the bell, and by angle-clips or brackets 22, attached to the frame-bar 6 and cylindrical extension 21. The bell 20, which concentrically surrounds the wheel 17 for concentrating and directing the wind thereupon, is provided with a series of tangentially-arranged deflecting plates or webs 23, which extend radially inward from the bell and serve to impart to the wind entering the latter a whirling or vortex motion before directing it on the blades 18, whereby a powerful rotary motion is imparted to the wind-wheel. Attention is here directed to the fact that the wind entering the bell is delivered to the concave faces of the blades and travels with a whirling motion down the latter until it contacts with the volute portion 19, whereby a final or extra impetus is exerted by the wind upon the wheel at the exit from the latter. Thus the wind, which loses a part of its power after first entering and contacting with the blade, is caused to exert a more uniform action throughout its passage through the wheel.

24 is a conical cap or shield disposed at the outer end of the wind-wheel and secured in place by a spider 25, having bearing upon and fixed to the outer end of the shaft 15. This shield serves the twofold function of preventing direct entrance of the wind to the wheel at the outer end thereof and of spreading or directing the wind outward toward the wall of the bell 20 and between the deflectors 23.

26 is a strengthening ring or band applied to the wind-wheel around the outer ends of the blades 18, while 27 is the usual vane, fixed in the present instance to the rear side of bar 6 of the frame and designed for facing the mouth of the bell 20 constantly and directly toward the wind, as will be readily understood and for obvious reasons.

In Figs. 4 to 6 I have shown the windmill provided with an automatic governing mechanism for controlling the quantity of wind admitted to the wheel, and consequently regulating the speed of the drive-shaft. In this connection all of the parts above described are the same in construction and operation except that the deflecting plates or webs 23 terminate at their inner ends in the curved extension or flanges 28, lying concentric with the wind-wheel axis and serving to partially close the air-inlet openings 29 between the webs and through which wind is admitted to the wheel.

30 designates a rotary wind-controlling or cut-off member, preferably of barrel-like form and surrounding the wind-wheel. This member has parallel plates or slats 31 of a width substantially equal to the width of the flanges 28 and alternated by spaces 32 of a width coincident with the width of the spaces 29. This member, which is rotary and during the operation of the windmill normally occupies a position with its slats 31 registering with the flanges 28, is provided at its ends with suitable raceways 33 for the reception of antifriction balls or rollers 34, traveling upon the outer face of ring 26 and the inner face of the tubular extension 21, respectively. From this construction it is apparent that by rotating the member 30 the wind-inlet openings 29 may be partially or even wholly closed, thus reducing the speed of the shaft or entirely stopping the wind-wheel.

Fixed upon shaft 10 is a collar 35, to which is pivoted two pairs of weighted governor-links 36, connected with a sliding collar 37, mounted upon the shaft and having a groove 38, engaged by a lever 39, centrally pivoted to an arm arising from the lower frame-bar 7 and connected by a rod or its equivalent 40 with a fixed arm 41, projecting rearwardly from the member 30, the lever being further provided with a rope or other operating member 42, depending to a position within reach of the operator. From this it will be seen that as the rotation of the wind-wheel increases beyond a certain predetermined speed the governor-weights will cause collar 37 to move upward upon the shaft, thus pulling downward upon rod 40 and rotating member 30 to cut off supply of wind to the wheel and accordingly decreasing the speed of the wheel, when of course the collar will again move downward and the member be reversely rotated, while the openings may be entirely closed for stopping the wheel by pulling downward upon the operating-rope 42, as will be readily understood.

From the foregoing it will be seen that I produce a device of simple construction which is admirably adapted for the attainment of the ends in view whereby manifold driving power is derived from a given wind force. In attaining these ends it is to be understood that I do not limit myself to the precise details herein set forth, inasmuch as minor changes may be made therein without departing from the spirit or scope of the invention.

Having thus described my invention, what I claim is—

1. The combination with a wind-wheel, of a collecting bell or member surrounding the wheel and having inwardly-converging walls terminating adjacent to the rear end of the latter, and webs or blades situated within the bell for imparting an initial vortex motion to the wind.

2. The combination with a wind-wheel, of a collecting bell or member having inwardly-converging walls surrounding the wheel for directing the wind thereto, and webs or blades disposed upon the inclined walls of the bell for imparting an initial vortex motion to the wind.

3. The combination with a wind-wheel, of an outwardly-opening conical collecting-bell surrounding the same for directing the wind thereto, and webs or blades disposed upon the inclined walls of the bell for imparting an initial vortex motion to the wind, said blades being curved in the plane of the direction of travel of the wheel.

4. The combination with a wind-wheel, of a collecting bell or member surrounding the same and having inwardly-converging walls for directing the wind thereto, webs or blades disposed upon the inclined walls of the bell for imparting an initial vortex motion to the wind, and a conical shield constantly disposed in front of the wind-wheel with its apex outward.

5. The combination with a horizontal wind-wheel having longitudinally-disposed blades curved transversely and provided at their inner ends each with a volute portion, of a collecting bell or member surrounding the wheel for directing the wind thereto and having lateral wind-inlet openings for delivering the wind transversely to the blades, and webs or blades situated within the bell for imparting an initial vortex motion to the wind.

6. The combination with a wind-wheel, of a wind-collecting bell surrounding the same and having wind-inlet openings, and a rotary cut-off automatically operable for regulating the size of said openings.

7. The combination with a wind-wheel, of a wind-collecting bell surrounding the same and having wind-inlet openings, webs or blades leading to the openings for imparting a vortex motion to the wind, and a rotating cut-off automatically operable for regulating the size of the openings.

8. The combination with a wind-wheel, of a wind-collecting bell surrounding the same and having lateral wind-inlet openings leading to the wheel, a rotary barrel-like member surrounding the wheel and having parallel spaced slats or plates, and means for automatically rotating the member for causing the slats to open or close the wind-inlet openings.

9. The combination with a wind-wheel, of a wind-collecting bell surrounding the same, webs or blades associated with the bell for imparting an initial vortex motion to the wind, said blades being provided at their inner ends with flanges spaced to form wind-inlet openings leading to the wheel, a rotary barrel-like member surrounding the wheel and having parallel spaced slats or plates, and means for automatically rotating the member to move the slats or plates into or out of register with the flanges for opening or closing the wind-inlet openings.

In testimony that I claim the foregoing as my own I have hereto affixed my signature in the presence of two witnesses.

JAMES DANIEL JOHNSON.

Witnesses:
E. H. JOHNSON,
T. A. UPDIKE.